Nov. 19, 1963  H. W. ALDRIN ETAL  3,111,182
SUSPENSION DEVICE FOR A TRACK-LAYING VEHICLE
Filed May 29, 1961

INVENTORS
HENRY WILHELM ALDRIN
ALF ALVAR HAMPUS JOHNSON
BY
ATTORNEYS

United States Patent Office 3,111,182
Patented Nov. 19, 1963

3,111,182
SUSPENSION DEVICE FOR A TRACK-LAYING
VEHICLE
Henry Wilhelm Aldrin, Bofors, and Alf Alvar Hampus
Johnson, Karlskoga, Sweden, assignors to Aktiebolaget
Bofors, Bofors, Sweden, a corporation of Sweden
Filed May 29, 1961, Ser. No. 113,315
Claims priority, application Sweden June 18, 1960
4 Claims. (Cl. 180—9.54)

The present invention relates to suspension devices for suspending the wheel supporting frames of a track-laying vehicle, and more particularly to suspension devices for track-laying vehicles of the kind in which the chassis is supported on crossbars pivotal about a lengthwise-shaft of the chassis, the ends of said crossbars engaging frames supporting the support wheels and the drive wheels for the tracks of the vehicle.

In vehicles of the general kind above referred to, it is necessary and customary to interpose cushioning devices between the ends of the crossbars and the frames. Such cushioning devices as are heretofore known, comprise elastic cushioning material fitted in recesses on the top side of the frames. It has been found that cushioning devices of this kind deteriorate rather rapidly as it is virtually impossible to prevent considerable penetration and accumulation of abrasive particles and moisture at the cushioning device, especially when the ambient temperature varies about the freezing point.

It is the broad object of the present invention to provide a novel and improved suspension device of the general kind above referred to, the elastic cushioning means of which remains serviceable for a considerably longer period of time than was heretofore attainable.

A more specific object of the invention is to provide a novel and improved suspension device in which accumulations of abrasive particles and moisture at the cushioning means are effectively impeded.

Another more specific object of the invention is to provide a novel and improved suspension device in which the cushioning means are so arranged that abrasive particles and moisture which may reach the cushioning means, remove themselves before any substantial wear at the cushioning means is caused.

Other and further objects, features and advantages of the invention will be pointed out hereafter and set forth in the appended claims constituting part of the application.

In the accompanying drawing, a preferred embodiment of the invention is shown by way of illustration and not by way of limitation.

Figure 1:
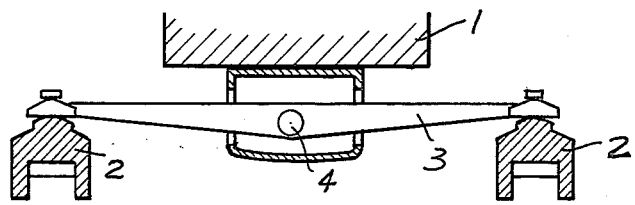
FIG. 1 is a diagrammatic fragmentary cross-section of a track-laying vehicle equipped with a suspension device according to the invention.
Figure 2:
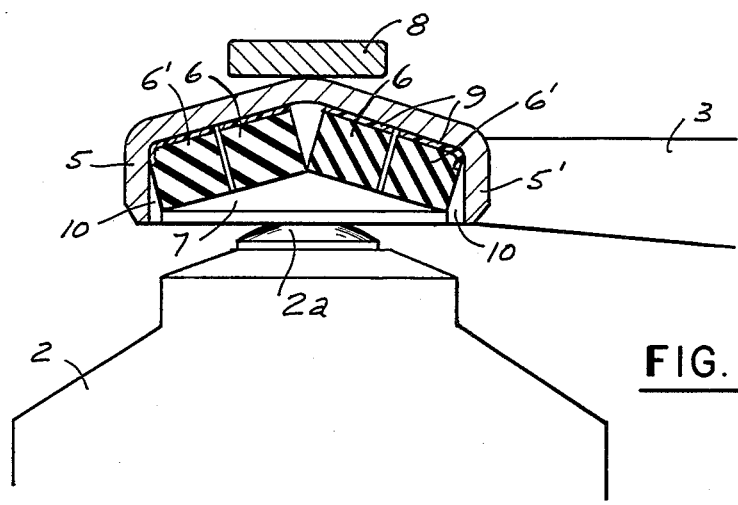
FIG. 2 is a cross-section of the suspension device on an enlarged scale.
Figure 3:
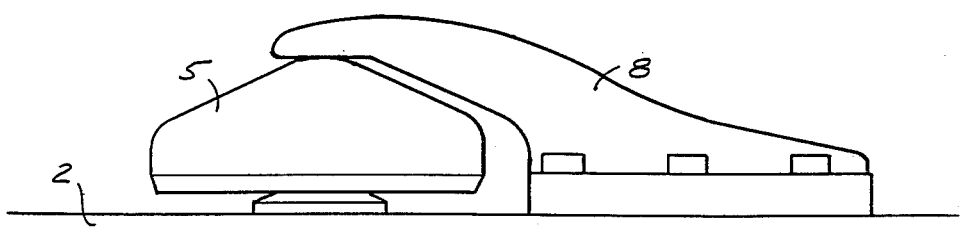
FIG. 3 is a side view of FIG. 2.

Referring now to the figures in detail, FIG. 1 indicates the chassis 1 of the vehicle and the track supporting frames 2. One or several crossbars 3 are pivotally supported on the chassis by means of a shaft 4 extending lengthwise of the chassis. The crossbar mounts at each end a downwardly facing, generally cup-shaped member 5. The cup-shaped member houses the cushioning means shown as two elastic pads 6 made, for instance, of rubber. The pads are suitably secured within member 5, for instance, by vulcanizing the pads to a conical base 9 which in turn is adhered to the bottom wall of member 5. As is clearly shown in FIG. 2, the generally wedge-shaped annular space 10 formed between the side wall 5' of cup member 5 and the outside of the outer pad 6', and also the space between the two pads 6 and 6', provide room for distention of the pads due to pressure and serve to discharge accumulations of moisture and abrasive particles. A pressure distributing member 7, such as a plate, is placed in front of pads 6. Member 7 rests upon frames 2 and more specifically, upon a spherically-shaped bearing surface 2a provided on the frames. A bracket 8 extending from crossbar 3 at each end thereof and secured thereto overlies the top of cup 5 to assure that the suspension devices at the ends of crossbar 3 are always in engagement with the bearing surface 2a while at the same time permitting turning of the frame in respect to the crossbars.

As is evident, the ingress of abrasive particles or moisture into the suspension device is effectively impeded and any deleterious substances which may reach the suspension device, cannot be accumulated in the same.

The downwardly facing receiver for the cushioning means is shown as being provided by member 5, but it would also be possible to provide downwardly facing recesses in bars 3 proper.

While the invention has been described in detail with respect to a certain now preferred example and embodiment of the invention, it will be understood by those skilled in the art after understanding the invention that various changes and modifications may be made without departing from the spirit and scope of the invention, and it is intended, therefore, to cover all such changes and modifications in the appended claims.

What is claimed as new and desired to be secured by Letters Patent is:

1. A suspension device for a track-laying vehicle of the kind having a chassis supported by crossbars mounted pivotal about a lengthwise shaft on the chassis and resting at each end upon a frame supporting the support wheels and the drive wheels of the vehicle, said suspension device comprising a downwardly facing, generally cup-shaped member at each end of a crossbar, and elastic cushioning pads fitted and retained in said cup-shaped member, said cushioning pads secured to the base of said member and defining an annular downwardly open space within said cup-shaped member between the side wall of the member and the cushioning pads, said space being adapted to receive distended portions of said cushioning means in response to compressive forces thereon and to discharge accumulations of moisture and abrasive particles, said cushioning pads being interposed between the bar and the respective frame.

2. A suspension device for a track-laying vehicle of the kind having a chassis supported by crossbars mounted pivotal about a lengthwise shaft on the chassis and resting at each end upon a frame supporting the support wheels and the drive wheels of the vehicle, said suspension device comprising a downwardly-facing, generally cup-shaped member having a cylindrical side wall at each end of a crossbar, and cushioning means fitted in said cup-shaped member in the form of spaced pads secured to the base wall of said cup-shaped member, and said cushioning means and said side wall defining therebetween an annular peripheral space of downwardly widening cross section to provide room for distention of the cushioning means due to pressure and to discharge accumulations of moisture and abrasive particles from the cup-shaped member, said cushioning means being interposed between the bar and the respective frame.

3. A suspension device for a track-laying vehicle of the kind having a chassis supported by crossbars mounted pivotal about a lengthwise shaft on the chassis and resting at each end upon a frame supporting the support wheels and the drive wheels of the vehicle, said suspension device comprising a downwardly facing, generally cup-shaped member having a cylindrical side wall at each end of a crossbar, and cushioning means fitted in said cup-shaped member in the form of spaced pads secured to the base wall of said cup-shaped member, said cushioning means and said side wall defining therebetween an annular peripheral space of downwardly widening cross section to provide room for distention of the cushioning means due to pressure and to discharge accumulations of moisture and abrasive particles from the cup-shaped member, a pressure distributing member fitted in full contact against said cushioning means on the side thereof facing the respective frame, said distributing member extending across the open side of said cup-shaped member except for the width of said peripheral space and communicating with said frame so as to interpose said cushioning means between said bar and said frame.

4. A suspension device for a track-laying vehicle of the kind having a chassis supported by crossbars mounted pivotally about a lengthwise shaft on the chassis and resting at each end upon a frame supporting the supporting wheels and the drive wheels of the vehicle, said suspension device comprising a downwardly facing, generally cup-shaped member at each end of a crossbar, said cup-shaped member having a conical base and a cylindrical side wall, and cushioning means in the form of ring-shaped elastic pads of generally rectangular cross section secured to said conical base in concentrically spaced-apart arrangement, the side wall of the cup-shaped member and the outer wall of the outermost pad defining therebetween an annular space of generally wedge-shaped, downwardly widening cross section, said annular space and the spacing between the pads providing room for distention of the pads due to pressure and effecting discharge of accumulations of moisture and abrasive particles from the cup-shaped member.

References Cited in the file of this patent
UNITED STATES PATENTS

| | | |
|---|---|---|
| 1,344,363 | Turnbull | June 22, 1920 |
| 2,238,002 | Pointer | Apr. 8, 1941 |
| 2,788,250 | Blattner | Apr. 9, 1957 |
| 3,010,530 | Risk | Nov. 28, 1961 |